Figure 2:
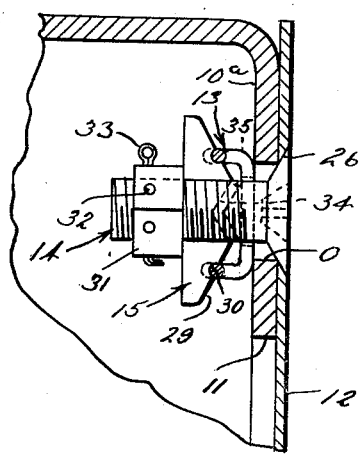

Dec. 12, 1944. A. R. LUMSDEN 2,364,906
RELEASABLE SECURING DEVICE
Filed March 27, 1942 2 Sheets-Sheet 1
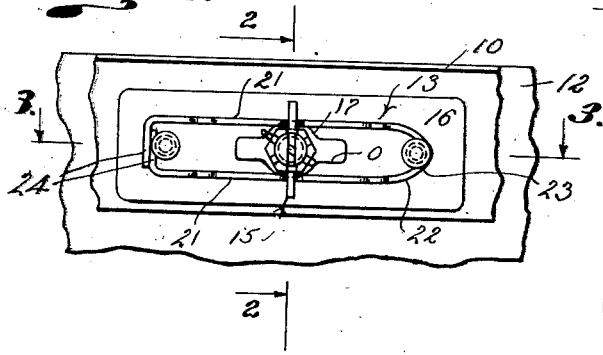
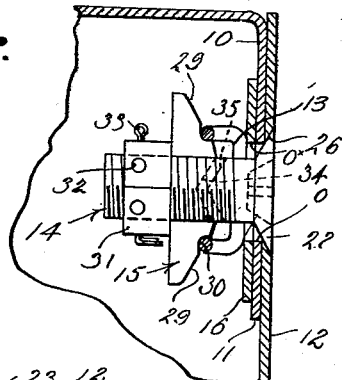
Inventor
Allen R. Lumsden
by W. H. Clapwell
Attorney Dec. 12, 1944.        A. R. LUMSDEN        2,364,906
RELEASABLE SECURING DEVICE
Filed March 27, 1942        2 Sheets-Sheet 2

Inventor
Allen R Lumsden
by
Attorney

Patented Dec. 12, 1944

2,364,906

UNITED STATES PATENT OFFICE 2,364,906

RELEASABLE SECURING DEVICE

Allen R. Lumsden, Los Angeles, Calif.

Application March 27, 1942, Serial No. 436,441

15 Claims. (Cl. 24—221)

This invention relates to securing or fastening devices and relates more particularly to releasable fastening means. A general object of this invention is to provide a simple dependable and effective releasable securing or fastening means.

The present invention is concerned with a securing means useful in various situations. I will herein make reference to several forms of the invention as useful in securing removable doors, covers, fuselage sections, etc., of aircraft, it being understood that this is a typical use or application and is not a limitation upon the usefulness of the invention.

Another object of this invention is to provide a fastening device that is extremely easy to install and operate and which may be readily released. The device of the present invention is merely inserted in place and the screw thereof is given a partial turn to complete the connection. The device is released by a partial turn of the screw whereupon the screw with the nut part or lock part may be removed.

Another object of this invention is to provide a releasable fastening device which leaves an entirely clear flush outer surface on the structure on which it is employed and the fastening device is light in weight. These two features particularly adapt the device for use on aircraft.

Another object of this invention is to provide a releasable fastening device that embodies a resilient wire unit on one of the parts to be secured and a novel nut part or lock part on the screw cooperable with the wire unit to bend or flex the wire thereof and thus utilize the resiliency of the wire to hold the parts connected in tight engagement, the lock part being so constructed that it has no tendency to break or detach the wire unit in the event the parts are not accurately aligned or positioned. In prior devices of the same general nature there has been a distinct tendency for the wire unit to break or become permanently distorted and unfit for use in the event the wire unit is not accurately positioned with respect to the other unit of the fastening device. The present invention overcomes this disadvantage and there is little or no tendency for the wire unit to be broken or distorted in the event that it is not accurately positioned with respect to the other unit of the fastening means.

Another object of this invention is to provide a releasable securing means of the character referred to in which the wire unit may be replaced in the event that it is displaced or broken. In prior devices of this general nature it is often very difficult, and sometimes impossible, to replace the wire unit when it is broken or lost.

Another object of this invention is to provide a releasable securing means of the character mentioned that may be readily adjusted or set to operate effectively where the parts to be connected are of different thicknesses. The nut part or lock part may be adjusted along the screw to adapt the device for use on parts of different thicknesses.

A further object of this invention is to provide a releasable connecting or securing means of the character mentioned in which the wire unit and the nut part or lock part have detent engagement which prevents the device from becoming loose or disconnected by vibrations, etc.

The various objects and features of my invention will be fully understood from the following detailed description of typical preferred forms and applications of my invention, throughout which description reference is made to the accompanying drawings, in which:

Fig. 1 is a fragmentary elevation view of the inner side of one form of releasable securing means of the invention and the parts connected thereby. Fig. 2 is an enlarged fragmentary vertical detailed sectional view taken as indicated by line 2—2 on Fig. 1. Fig. 3 is an enlarged fragmentary horizontal detailed sectional view taken as indicated by line 3—3 on Fig. 1. Fig. 4 is a view similar to Fig. 1 illustrating another embodiment of the invention. Fig. 5 is an enlarged fragmentary vertical detailed sectional view taken as indicated by line 5—5 on Fig. 4. Fig. 6 is an enlarged fragmentary horizontal detailed sectional view taken as indicated by line 6—6 on Fig. 4. Fig. 7 is an enlarged fragmentary elevation view of an alternative means for anchoring one end of the spring unit and Fig. 8 is an enlarged fragmentary detailed sectional view of the structure shown in Fig. 7 with the wire unit in place to be locked against displacement. Fig. 9 is a view similar to Fig. 2 wherein the parts are such that no reinforcement is needed.

In Figs. 1, 2 and 3 I have shown one form of the invention used with a supporting part, shell or body part which I will term a sheet 10. The sheet 10 has an opening 11 which may be in the nature of an access opening, manhole, or the like, and an outer plate or cover 12 is provided to cover or close the opening 11. The cover 12 is adapted to lie flat against the outer surface of the sheet 10. It is to be understood that the opening 11 and the cover 12 may be of substantial extent and that several releasable fastening devices of the invention may be spaced along the margin of the cover 12 to secure the same to the sheet 10.

The fastening devices of the invention illustrated in Figs. 1, 2 and 3 may be said to comprise, generally, a resilient latch unit 13 on the inner side of the sheet 10, a stud or screw 14 carried by the cover 12 and passed through an opening O in the sheet 10, and a nut or lock part 15 on the screw 14 for cooperating with the unit 13.

The unit 13 presents or forms a flexible resilient latch or keeper element at the inner side of the plate or sheet 10. Where the sheet 10 is formed of thin material or stock, as illustrated in Figs. 2 and 3, it is preferred to mount the unit on a reenforcing plate 16. The plate 16 is rectangular and elongate for the reason which will later become apparent and is fixed against the inner or rear surface of the sheet 10. Plate 16 has an opening $O^x$ registering with the opening O. The above mentioned opening O passes through the sheet 10 and its reenforcing plate 16. The opening O is elongated or of slot form and has an enlargement 17 between its ends. The widened portion or enlargement 17 of the opening O is preferably spaced midway between the ends of the opening and may be defined by cylindrically curved walls. The longitudinal axis of the elongate opening O extends longitudinally of the elongate plate 16 and the plate serves to reenforce that portion of the sheet 10 which is weakened to some extent by the provision of the opening O.

When the sheet is thicker, as shown at $10^a$ in Fig. 9, then the reinforcing plate 16 may be eliminated. In such case the structure would be as shown in Fig. 9.

The unit 13 includes anchors or posts 18 projecting from the rear surface of the reenforcing plate 16. The posts 18 are spaced beyond the opposite ends of the opening O and preferably lie in the longitudinal axis of the opening. In practice the posts 18 may be in the form of securing parts such as rivets and in accordance with the invention may serve to secure the reenforcing plate 16 to the sheet 10. Where the posts 18 are in the nature of rivets they have shoulders 19 bearing against the rear surfaces of the plate 16 and their heads are set in the sheet 10 to lie flush with the outer surface of the sheet. The anchors or posts 18 have suitable heads 20 spaced from the rear surface of the reenforcing plate 16.

The unit 13 further includes a pair of spaced flexible resilient arms or parts 21 spaced inwardly or rearwardly from the plate 16 and anchored by the posts 18. The parts 21 are the active elements of the unit 13, being engageable by the part 15. In the preferred construction the resilient parts 21 lie in substantially parallel planes and are in parallel relation to the longitudinal axis of the opening O. The parts 21 are spaced outwardly or laterally beyond the sides of the elongate opening O occupying planes which cross or are in tangent relation to the opening enlargement 17.

In accordance with the preferred construction the resilient parts 21 are side portions of an elongated loop of wire or other suitable stock. This wire loop has portions 22 stepped or bent inwardly and has a reduced or curved closed end part 23 which engages on one of the posts 18. The closed end part 23 of the wire loop is held in cooperation with the post 18 by its head 20. The wire at the other end of the loop has overlapping portions 24 which cooperate with the other post 18 and which are held on the post by the post head 20. If desired, the overlapping wire portions 24 may be soldered together or otherwise secured one to the other. It will be observed that the unit 13 has as its principal element a simple wire part that may be easily installed on the posts 18. The posts 18 serve to hold the wire loop structure where the parts 21 are in the proper parallel relation to the opening O and the stepped portions 22 serve to hold the resilient parts 21 in the correct spaced relationship to the rear surface of the reenforcing plate 16. As initially constructed and installed the resilient parts 21 lie substantially parallel with the rear face of the plate 16. In the preferred construction detent notches or depressions 25 are formed in the resilient parts 21. The depressions 25 occur midway between the ends of the portions 21 to be at the enlargement 17 of the opening O and may be formed by bending the wire forming the parts 21.

It should be observed that the wire loop structure just described is formed and proportioned so that it may be passed inwardly through the opening O and then engaged on the posts 18 to occupy its operative position at the inner side of the sheet 10. This is important as it provides for the ready replacement of a wire loop unit that may be displaced or broken. The loop is proportioned so that it may be readily passed through the opening O when arranged with its long axis substantially normal to the sheet 10 and with its transverse axis substantially parallel with the long walls of the opening O. When the loop has been entered behind the sheet 10 one end of the loop is engaged on a post 18 to be retained thereon by its head 20. The loop is then brought to a position where its opposite end portion engages the head 20 of the other. The loop is then urged toward the sheet 10 with substantial force so that its engagement with the rounded head 20 causes slight elongation of the loop and the loop snaps over the head. This latches or engages the loop on said other post 18 and completes the replacement of the loop.

The screw 14 serves to carry and actuate or control the lock part 15. The screw 14 may be a simple flush head type screw passed inwardly through an opening 26 in the cover 12 and adapted to project through the opening O to extend a considerable distance rearwardly beyond the reenforcing plate 16. The opening 26 may be formed so that the head 27 of the screw 14 lies flush with the outer surface of the cover 12.

The latch or lock part 15 is carried by the screw 14 to cooperate with the resilient parts 21 of the unit 13 to releasably hold the cover 12 in tight cooperation with the sheet 10. In this form of the invention the lock part 15 is a generally flat elongate member carried in a diametric slot 28 in the screw 14. The slot 28 enters the rear end of the screw 14 and is of substantial depth. The part 15 extends through the inner portion of the slot 28, that is, the portion of the slot closest to the head 27 and projects radially from opposite sides of the screw. The rear edge of the part 15 may be straight. The forward edge of the part 15 is shaped to cooperate with and have latching engagement with the resilient parts 21. As best illustrated in Fig. 2 of the drawings the forward edge of the lock part 15 has two pitched or sloping faces 29. The edges or surfaces 29 slope outwardly and rearwardly from adjacent the screw 14 and each surface 29 has a detent notch 30 spaced between its ends.

The notches 30 are cooperable with the depressions 25 to latch the part 15 in cooperation with the resilient parts 21. A nut 31 is adjustably threaded on the screw 14 and is engageable with the straight rear edge of the lock part 15 to hold the lock part in the position for cooperation with the resilient parts 21 of the unit 13. The nut 31 is provided with a series of circumferentially spaced openings 32 to receive a cotter key 33. The cotter key 33 may be passed through the pair of openings which register with the slot 28 and engages in the slot to hold the nut 31 against turning. It will be apparent how the nut 31 may be adjusted to the required position and then locked in place by means of the cotter key 33. With the construction just described it will be seen that the latch part or lock part 15 is carried by the screw 14 to cooperate with the resilient parts 21 and to turn with the screw.

The invention provides means for holding the latch part or lock part 15 against displacement from the screw 14, which means provides for limited movement of the lock part in directions both axially and radially of the screw so that the lock part will adapt itself to the resilient parts 21 and have correct engagement with the parts 21 even though the screw 14 may not be truly centered with respect to the unit 13. This means includes a pointed or tapering wall 34 at the inner or forward end of the slot 28 and a complementary tapering or V-shaped notch 35 in the forward edge of the lock part 15. The nut 31 may be set or locked in a position such as illustrated in the drawings where the lock part 15 has some axial play between the nut and the tapering slot wall 34. This axial play allows the lock part 15 to shift transversely or radially with respect to the screw 14 so that the notches 30 will come into correct cooperation with the depressions 25 even though the screw 14 may not be equally spaced between the resilient parts 21. The tapering wall 34 extending into the notch 35 prevents lateral detachment or displacement of the lock part 15 but permits the required automatic lateral adjustment of the lock part. The sloping faces 29 assist in directing the resilient parts 21 into the notches 30.

It is believed that the operation of the securing means of Figs. 1, 2 and 3 will be readily understood from the foregoing detailed description. When the plate or cover 12 is to be secured on the sheet 10 the screw 14 is turned so that the lock part 15 can be passed inwardly through the opening O. The screw 14 and the lock part 15 are passed inwardly to pass between the resilient parts 21 and to bring the cover 12 against the face of the sheet 10. The screw 14 is then given a partial rotation or a turn of about 90°. When this is done the lock part 15 is swung into cooperation with the resilient parts 21 of the unit 13. When the part 15 is swung into cooperation with the resilient parts 21 the parts 21 are bent or flexed forwardly toward the plate 16 and when the lock part 15 assumes a position substantially normal to the resilient parts 21 the parts 21 snap into the notches 30, that is, the depressions 25 of the resilient parts 21 cooperate with the notches 30 of the lock part 15. The resiliency of the flexed parts 21 urges the cover 12 inwardly and holds the cover tight against the face of the sheet 10. It will be seen that the resiliency of the parts 21 also serves to maintain the lock part 15 in the latched position and the notches 30 and depressions 25 effectively resist any tendency of the part 15 to turn. It is to be particularly noted that when the screw 14 is turned to move the lock part 15 to the operative position that the lock part 15 is free to shift in the slot 28 through its engagement with the resilient parts 21 and thus may accurately center itself with respect to the parts 21 in cases where the screw 14 is not equally spaced between the two lock parts. Thus, the shifting lock part 15 compensates for any slight misalignment there may be. To release the connection the screw 14 is merely turned about 90° to disengage the lock part 15 from the resilient parts 21 and to bring the lock part into a position where it may pass out through the opening O.

The form of the invention illustrated in Figs. 4, 5 and 6 may be said to comprise, generally, a resilient unit 40 at the inner side of the sheet 10', a screw 41 on the cover 12' adapted to pass inwardly through an opening 42 in the sheet 10 and a latch part or lock part 43 on the screw 41 for cooperating with the resilient unit 40.

In Figs. 4, 5 and 6 it will be assumed that the sheet 10' is of heavier stock than in Figs. 1, 2 and 3 and that there is no need for a reenforcing plate 16 at the opening 42. It is to be understood that the structure of Figs. 4, 5 and 6 may, if desired or necessary, embody a reenforcing plate 16. The opening 42 in the sheet 10' may be substantially the same as the opening O above described and, illustrated, is an elongate generally rectangular opening with an enlargement 44 intermediate its ends.

The unit 40 in this form of the invention includes two spaced flexible resilient parts 45 engageable by the latch part or lock part 43. These resilient parts 45 extend substantially parallel with the long axis of the opening 42 and are spaced apart to lie in planes beyond the sides of the opening 42, which planes may intersect the opening enlargement 44, as illustrated. The resilient parts 45 constitute the spaced arms of an elongate generally U-shaped wire element. There may be a single continuous length of wire or other suitable stock bent or shaped to have the spaced parts 45 and to be stepped downwardly or inwardly at the opposite ends of the parts 45 to have portions 46 which bear on the inner surface of the sheet 10'. The closed end portion 47 of the generally U-shaped wire member is shaped or bent to be pitched forwardly and toward the longitudinal axis of the screw 41. The free ends of the wire are bent or shaped to have parts 48 which are likewise pitched forwardly and toward the longitudinal axis of the screw 41. Openings 49 are provided in the sheet 10' to receive the end portion 47 and the end parts 48 of the unit 40. The openings 49 are spaced beyond the opposite ends of the elongate opening 42 and are elongate or slot-like with their long axes transverse of the long axis of the opening 42. The walls 50 of the opening 49 which lie nearest to the opening 42 are pitched or bevelled in the same direction as the end portion 47 and the end parts 48 of the wire unit 40. The closed end portion 47 and the free end parts 48 are engaged or snapped into the openings 49 to latch or cooperate with the pitched walls 50. The forwardly convergent portions 47 and parts 48 cooperating with the under cut walls 50 effectively lock or secure the unit 40 on the sheet 10'. It should be observed, however, that the openings 49 are of sufficient length to permit the portion 47 and the parts 48 to shift longitudinally in them, that is, in a direction transverse of the long axis of the opening 42. The resilient wire unit 40 is constructed and proportioned so that the portion 47 and end parts 48 cannot become displaced from the openings 49 during any normal use of the device. It is to be observed that the unit 40 may be introduced through the opening 42 and manipulated behind the sheet 10' by a suitable tool to have its portion 47 and end parts 48 snap or latch into the openings 49. Thus, the unit 40 may be installed on the inner side of the sheet 10' from the front face of the sheet if this becomes necessary.

The stud or screw 41 serves to carry and operate the latch part 43. The screw 41 is passed inwardly through an opening 51 in the cover 12' and has a shank 41ˣ adapted to extend through the opening 42 and to pass rearwardly between the resilient parts 45. The head 52 of the screw 41 may be received in the opening 51 to lie flush with the face of the cover 12'.

The latch part 43 is carried by the screw 41 to cooperate with the resilient parts 45. The part 43 is in the nature of a block or nut threaded on the screw 41. The part 43 is spaced inwardly or rearwardly from the head 52 to be behind the parts 45 when the cover 12' is arranged in place against the sheet 10'. Diametrically opposite wings 53 project from the latch part 43 for engagement with the resilient parts 45. The rear edges 54 of the wings 53 may be rearwardly convergent to assist in guiding the part 43 between the resilient wire parts 45. The forward edges of the wings 53 are shaped to cooperate and latch with the resilient wire parts 45. Notches or grooves 55 are provided in the forward edges of the wings 53 adjacent the hub of the latch part 43 to receive the wire parts 45. The leading corners of the wings 53 relative to the right hand direction of rotation are preferably bevelled off as at 56 and may be pitched to assist in guiding or directing the wire parts 45 into the grooves 55.

Means is provided for setting or securing the latch part 43 on the screw 41 in a position where its wings 53 will cooperate with the resilient wire parts 45 to flex the same forwardly when the latch part is turned behind the wire parts. In Fig. 5 of the drawings this means comprises a set screw or jamb screw 57 threaded in the outer end of the latch part 43 and adapted to clamp or jamb against the end of the screw 41 to lock the part 43 in the required position. In the structure shown in Fig. 6 a jamb unit 58 is threaded on the screw 41 to clamp against an end of the latch part 43 to lock or set the same in the required position. The lock or latch part 43 is set in an adjusted position where the engagement of its wings 53 with the resilient wire parts 45 will bend the wire parts forwardly when the latch part 43 is turned to its operative position.

It is to be understood that either cam or latch part 15 or 43 may be used in conjunction with either spring wire unit 13 or 40.

Figs. 7 and 8 of the drawings illustrate an alternative means for securing or anchoring the ends of the resilient wire unit on the sheet 10'. In this construction openings 49ᵃ are formed in the sheet similar to the openings 49. Ears 60 and 61 spring from the front and rear faces, respectively, of the sheet 10' and project toward one another across the opening 49ᵃ. The ears 60 and 61 are initially spaced apart a sufficient distance to allow the end portion 47 of the unit 40 to be engaged or hooked on the ear 61. With the part 47 hooked on the ear 61 the part 60 is bent rearwardly to a position where it prevents the part 47 from becoming disengaged from the ear 61. It is to be understood that the structure shown in Figs. 7 and 8 of the drawings may be employed to anchor the unit 13, shown in Figs. 1, 2 and 3, and to anchor either or both ends of the unit 40 shown in Figs. 4, 5 and 6.

In the use or operation of the means illustrated in Figs. 4, 5 and 6 the latch part 43 is adjusted along the screw 41 to a position where its wings 53 will have the required engagement with the resilient parts 45 and the latch part 43 is set in the adjusted position by the set screw 57 or the lock nut 58. When the cover 12 is to be secured on the sheet 10 the screw 41 is turned to position the latch part 43 for ready passage through the opening 42 and the cover is brought against the sheet 10 to enter the lock part 43 through the opening 42 and to bring the lock part to a position behind the resilient wire parts 45. The screw 41 is then turned about 90° so that the wings 53 are brought to positions where they are transverse of the elongate opening 42. During this movement of the wings 53 the grooves 55 receive the spaced resilient wire parts 45 and the latch part 43 is so positioned that this engagement results in forward flexure of the wire portions with a resultant rearward force exerted on the screw 41 to hold the cover 12 tight against the sheet 10. It should be observed that in the event the screw 41 is not accurately centered between the resilient wire parts 45 that the engagement of the pitched surfaces and the grooves 55 with the wire parts 45 may result in a lateral shifting of the unit 40 to bring the unit to a position where it is centralized with respect to the screw 41 and latch part 43. When it is desired to release or remove the cover 12 the screw 41 is turned about 90° to swing the wings 53 free of the resilient wire parts 45, whereupon the cover 12 may be moved outwardly to move the lock part 43 outwardly through the opening 42.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A releasable fastening means for securing two members together, one member having an opening, said means comprising a turnable stud on the other member adapted to pass through said opening and two cooperable latch parts, one a resilient unit on the member which has said opening, the other a latch part carried by the stud to project laterally therefrom and to be inserted through the opening with the stud and turnable with the stud, one of said parts being supported for bodily lateral movement relative to said opening so that said parts are related for relative bodily movement in a lateral direction to assure correct latching cooperation of said parts when the latch part is turned into engagement with the resilient unit.

2. A releasable fastening means for securing two members together, one member having an opening, said means comprising a turnable stud on the other member adapted to pass through said opening and two cooperable latch parts, one a resilient unit mounted on the inner side of the member which has said opening, said unit having a pair of spaced portions behind said opening, the other part being a latch element carried by the stud to project laterally therefrom and to be inserted through the opening with the stud and turnable with the stud and adapted to be passed through said opening and between said portions to latch with said portions upon turning of the stud, one of said parts being bodily shiftable in a lateral direction relative to the stud whereby said parts automatically assume the correct relationship when the latch element is turned into cooperation with said spaced portions.

3. A releasable fastening means for securing two members together, one member having an opening, said means comprising a turnable stud on the other member, resilient means adapted to be passed through the opening to a position behind the member which has the opening, means on the member which has the opening for removably anchoring the resilient means thereon, the resilient means including spaced parts at opposite sides of the axis of the opening, a latch part carried by the stud to project laterally therefrom and to be inserted through the opening with the stud and turnable with the stud adapted to be passed through said opening and through the space between said parts and turnable into latching cooperation with said parts, and means at the stud whereby the position of the latch part along the studs can be adjusted by rotating the stud.

4. A releasable fastening means for securing two members together, one member having an opening, said means comprising a turnable stud on the other member, resilient means at the back of the member which has the opening, the resilient means including a part at each side of the axis of the opening, a latch part carried by the stud to project laterally therefrom and to be inserted through the opening with the stud and turnable with the stud adapted to be passed through said opening and through the space between said parts and turnable into latching cooperation with said parts, and means holding the resilient means in place at the back of the member with the opening so it is bodily shiftable relative to said members to be automatically centralized relative to the latch part when engaged by the latch part.

5. A releasable fastening means for securing two members together, one member having an opening, said means comprising a turnable stud on the other member, resilient means at the back of the member which has the opening, the resilient means including a part at each side of the axis of the opening, a latch part carried by the stud to project laterally therefrom and to be inserted through the opening with the stud and turnable with the stud adapted to be passed through said opening and through the space between said parts and turnable into latching cooperation with said parts, and a projection on the member having the opening to receive and hold said latch part so it is shiftable laterally relative to the stud to automatically centralize itself when turned into engagement with the first named parts.

6. A releasable fastening means for securing two members together, one member having an opening, said means comprising a turnable stud on the other member, resilient means on the member which has the opening, the resilient means including a single length of wire adapted to be passed through said opening to the rear side of the member which has the opening, means for anchoring the resilient means on the rear side of said member to have a part at each side of the opening, the anchoring means being releasable to permit replacement of the resilient means, a latch part carried by the stud to project laterally therefrom and to be inserted through the opening with the stud and turnable with the stud adapted to be passed through said opening and through the space between said parts and turnable into latching cooperation with said parts, and means threaded to the stud to adjust the latch part along the stud.

7. A releasable fastening means for securing two members together, one member having an opening, said means comprising a turnable stud on the other member, resilient means adapted to be passed though said opening to a position behind the member which has the opening, the resilient means including an elongate loop of wire having longitudinal side parts, means on the member which has the opening for engaging in the ends of the loop to replaceably anchor the loop on said member where said side parts extend at opposite sides of said opening, the anchor means at one end of the resilient means allowing the resilient means to shift laterally, a latch part carried by the stud to project therefrom and turn therewith and adapted to be passed through said opening and through the space between said side parts and turnable into latching cooperation with said side parts, and means for adjusting the latch part along the stud.

8. A releasable fastening means for securing two members together, one member having an opening, said means comprising a turnable stud on the other member, resilient means on the member which has the opening, the resilient means including a part at each side of the opening, said stud having a transverse slot, and a latch part in said slot movable into latching cooperation with said parts upon turning of the stud.

9. A releasable fastening means for securing two members together, one member having an opening, said means comprising a turnable stud on the other member, resilient means on the member which has the opening, the resilient means including a part at each side of the opening, said stud having a transverse slot, and a latch part in said slot movable into latching cooperation with said parts upon turning of the stud, the latch part being shiftable in the slot to centralize itself relative to said parts.

10. A releasable fastening means for securing two members together, one member having an opening, said means comprising a turnable stud on the other member, resilient means on the member which has the opening, the resilient means including a part at each side of the opening, said stud having a transverse slot, a latch part in said slot movable into latching cooperation with said parts upon turning of the stud, and means for adjusting the latch part longitudinally of the stud.

11. A releasable fastening means for securing two members together, one member having an opening, said means comprising a turnable stud on the other member, resilient means on the member which has the opening, the resilient means including a part at each side of the opening, said stud having a transverse slot, a latch part passing through the slot and movable into latching cooperation with said parts upon turning of the stud, the latch part being shiftable in the slot in a direction diametric of the stud to centralize itself relative to said parts, and means for adjusting the latch part longitudinally of the stud.

12. A releasable fastening means for securing two members together, one member having an opening, said means comprising a turnable stud on the other member adapted to pass through said opening and two cooperable latch parts, one a resilient unit on the member which has said opening, said unit having a pair of spaced portions behind said opening, the other part being a latch element turnable with the stud and adapted to be passed through said opening and between said portions to latch with said portions upon turning of the stud, one of said parts being shiftable in a lateral direction relative to the stud whereby said parts automatically assume the correct relationship when the latch element is turned into cooperation with said spaced portions, and screw thread means for adjusting the latch element longitudinally of the stud.

13. Means for releasably securing an outer member to an inner member, the inner member having a slot and openings spaced from opposite ends of the slot, said means comprising a turnable stud on the outer member, a resilient means on the inner side of the inner member comprising a wire, having its ends removably anchored in said openings, and a latch part on the stud to be passed through the slot and turnable into latching cooperation with said wire.

14. Means for releasably securing an outer member to an inner member, the inner member having a slot and openings spaced from opposite ends of the slot, said means comprising a turnable stud on the outer member, a resilient means on the inner side of the inner member comprising a length of wire of generally U-shape having its ends anchored in said openings and having its side parts at opposite sides of the slot, and a latch part on the stud adapted to be passed through the slot and turnable into latching cooperation with said side parts.

15. Means for releasably securing an outer member to an inner member, the inner member having a slot and openings spaced from opposite ends of the slot, said means comprising a turnable stud on the outer member, a resilient means on the inner side of the inner member comprising a length of wire of generally U-shape having its ends anchored in said openings and having its side parts at opposite sides of the slot, and a latch part on the stud adapted to be passed through the slot and turnable into latching cooperation with said side parts, the ends of the wire being shiftable in said openings so that the unit will centralize itself relative to the latch part.

ALLEN R. LUMSDEN.